W. F. FREEMAN.
TROLLEY HARP EXTENSION.
APPLICATION FILED AUG. 15, 1919.
1,357,630.
Patented Nov. 2, 1920.
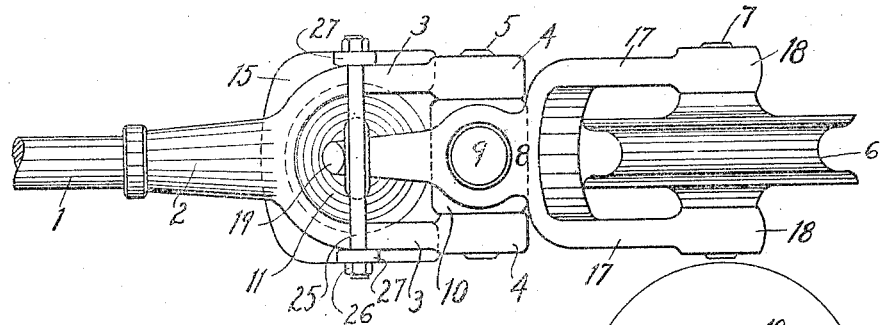
FIG. 1.
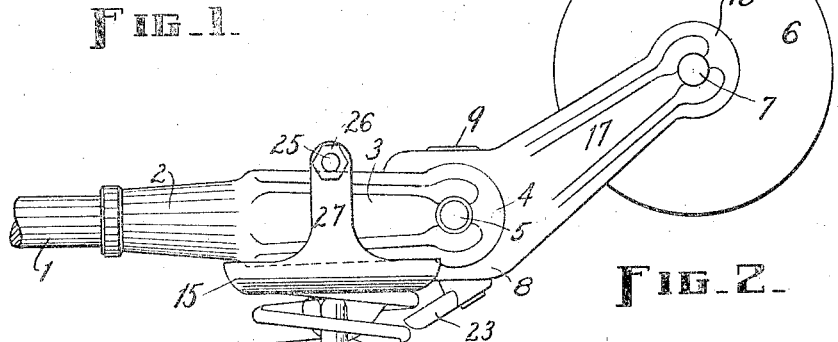
FIG. 2.
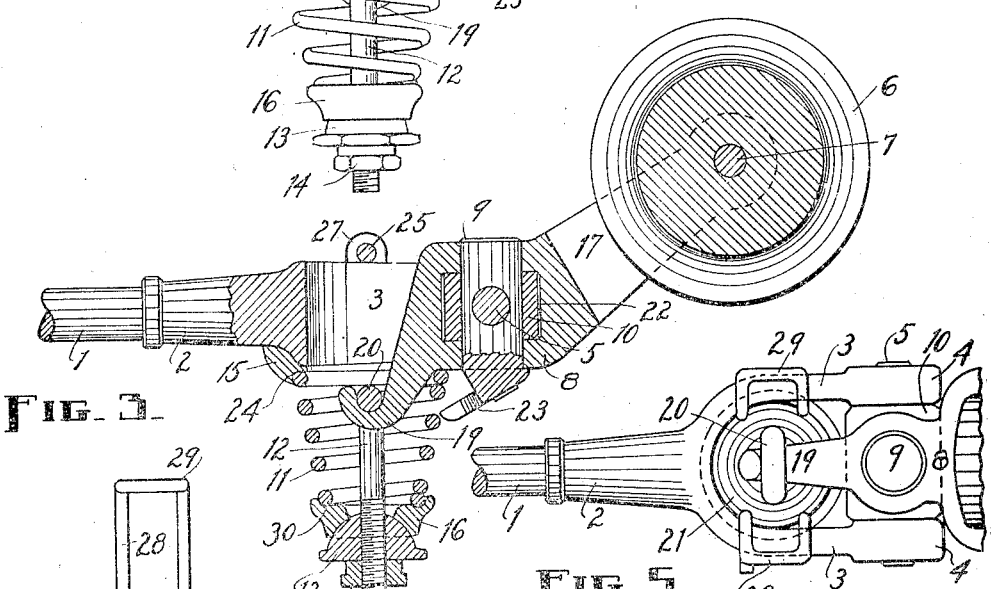
FIG. 3.
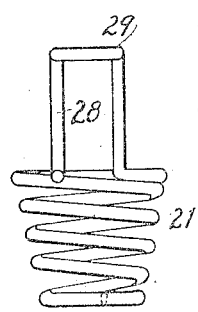
FIG. 4.
FIG. 5.
INVENTOR.
Walter F. Freeman,
BY
Frank A. Cutter,
ATTORNEY.

UNITED STATES PATENT OFFICE.

WALTER F. FREEMAN, OF PITTSFIELD, MASSACHUSETTS.

TROLLEY-HARP EXTENSION.

1,357,630.  Specification of Letters Patent.  Patented Nov. 2, 1920.

Application filed August 15, 1919. Serial No. 317,749.

*To all whom it may concern:*

Be it known that I, WALTER F. FREEMAN, a citizen of the United States of America, and a resident of Pittsfield, in the county of Berkshire and State of Massachusetts, have invented a new and useful Trolley-Harp Extension, of which the following is a specification.

My invention relates to improvements in the so-called harps of trolley poles, and consists essentially of a supplementary or auxiliary member of the harp type, which is pivotally connected with the ordinary trolley-pole harp, and carries the trolley wheel, and certain peculiar yielding or resilient means to retain said member normally at an angle with the trolley pole, but adapted to permit said member to be actuated into line approximately with said pole, or, in other words, to allow said member with said wheel to move upon the old trolley-wheel axle of said harp, together with such other parts and members as may be needed or desired in order to render the device practical and efficient in every respect, all as hereinafter set forth.

In the present method of conducting electricity from an overhead wire to a car, by means of a wheel mounted in a harp rigidly attached to the upper end of a pole, such wheel is held against said wire with a great amount of pressure by means of springs attached to the lower end of said pole, in the manner well understood. This pressure is necessary in order to prevent the wheel from leaving the wire. The pole is of considerable length and quite heavy so that large springs are required to maintain it in elevated position, and there is lacking the required flexibility to enable said pole to adapt or adjust itself quickly enough to meet the conditions arising from the jolting of the car over a rough road bed, or from an uneven or deflected overhead wire, with the result that said wheel is frequently caused to leave the wire and the supporting wires are damaged by said pole, under the old construction. Furthermore, the wheel is so held or supported that it binds or pinches the wire, in rounding a curve, and so causes both said wheel and wire to be greatly worn and said wire consequently to be weakened. The primary object of my invention, therefore, is to provide a comparatively simple and inexpensive trolley mount or harp extension, which can be attached to the ordinary harp by removing the wheel and using the axle of said harp for the axle of the attachment, whereby the desired flexibility and sensitiveness of the trolley wheel and supporting parts are obtained, and the above-noted objections eliminated.

With my new construction the pressure of the trolley wheel against the overhead wire is greatly reduced, said wheel is capable of quickly adapting itself to unevenness in said wire in any direction, and to the jolting of the car, and the liability of said wheel to leave the wire is reduced to the minimum.

A further advantage of my invention is found in the fact that the wheel may be kept in line with the pole when necessary. The lateral motion which is inherent in my device insures a perfect contact between the wheel and the wire in rounding a curve. Wear on both trolley wheel and overhead wire is greatly lessened, and the damage to supporting wires resulting when said wheel leaves said overhead wire is reduced to the minimum.

Other objects and advantages will appear in the course of the following description.

I attain the objects and secure the advantages of my invention by the means illustrated in the accompanying drawings, in which—

Figure 1 is a top plan of a trolley harp extension which embodies a practical form of my invention; Fig. 2, a side elevation of said extension; Fig. 3, a central, longitudinal, vertical section through said extension; Fig. 4, an elevation of a spring which may be used in place of the spring and upper bearing therefor in the first construction, and, Fig. 5, a top plan of an extension equipped with the spring shown in the preceding view, the forward end portion of the supplementary harp being broken off.

Similar reference characters designate similar parts throughout the several views.

In the drawings I show at 1 the upper terminal of a trolley pole, and at 2 a harp with which said pole is ordinarily provided. The harp 2 is forked as usual to form arms 3—3 at the outer ends of which are bearings 4—4 for an axle 5. A trolley wheel, such as 6, is usually mounted on the axle 5, but in the present device such wheel is mounted on an axle 7, as will presently be more fully explained.

The supplementary attachment or extension comprises what may be termed a supplementary harp 8, a universal-joint connection consisting of the axle 5, a pin 9, and a block 10, a spring 11 (or 21), a bolt 12, a bearing support 13 and a nut 14 on said bolt, a top bearing 15 in the construction wherein said spring 11 is employed, and a bottom bearing 16 for either spring.

The harp 8 has arms 17—17 at the outer ends of which are bearings 18—18 for the axle 7 upon which the wheel 6 is mounted, and to this extent is similar to the harp 2. The harp 8 has at the inner end a downwardly-offset, hooked tail-piece 19. The tail-piece 19 extends downwardly between the arms 3 and below such arms, and the bolt 12 has a part 20 to receive the hooked terminal of said tail-piece.

The block 10 is inserted in a slot or recess 22 which extends through the harp 8 from side to side, and the pin 9 extends through said block and those portions of said harp which are above and below the block. The axle 5 extends through the bearing 4, the block 10, and the pin 9, at right-angles, of course, to said pin. The pin 9 is provided at the bottom with a lug or stop 23 which is designed to come into contact with adjacent portions of the bearing 15, when the harp 8 is actuated to an extent which locates the axle 7 approximately in line with the pole 1, and so to limit the movement of said harp in the direction thereof which compresses the spring 11, in the one case, or to contact with the bottoms of the arms 3 for a similar purpose, in the other case. The stop 23 thus prevents undue compression of the spring in either case, but more particularly is useful in limiting the independent movement of the harp 8, that is, independent of the oscillatory movement of the pole 1, produced by the overhead wire acting through the wheel 6. Otherwise parts of the supporting members for the wheel 6 might come into contact with the overhead wire.

The bolt 12 depends from the tail-piece 19, and the support 13 and the nut 14 are screwed on to the lower terminal of said bolt, with the bearing 16 resting on said support. By means of the support 13 the tension of the spring 11 (or 21) is regulated. The nut 14 serves as a locking member for the support 13. The top of the support 13 is convex and the bottom of the bearing 16 conforms to and rests upon such convex top. A swivel motion is thus provided for which permits the bolt 12 to be partially rotated by the tail-piece 19 when the harp 8 is swung to the right or left on the pin 9.

In the first construction the bearing 15, which has an annular groove 24 in the bottom thereof to receive the upper end of the spring 11, is received against the under side of the forked portion of the harp 2, and held in place by means of a cross-rod 25 and a nut 26 on said rod. The bearing 15 has a pair of upstanding arms 27 which are contiguous with and extend above the arms 3, and through the upper terminals of which the rod 25 passes, above the upper edges of said arms 3. The rod 25 is in the form of a bolt, the head of which is outside of one of the arms 27, and the nut 26 on which is outside of the other of said arms 27. The rod or bolt 25 assists in preventing the bearing 15 from becoming displaced, and, of course, prevents said bearing from falling away from the harp 2 in the event of the displacement or removal of the spring 11.

The spring 11 is helical or helicoid, somewhat after the type of the old style bed spring, this form being preferred because of its peculiar adaptability for the use which is made of it in the present invention.

The spring 21 is similar to the spring 11, except that it has upwardly extending parts 28—28, which are receivable inside of the arms 3, said parts having outwardly extending lips or lugs 29—29 that are adapted to bear on the upper edges of said arms. The spring 21 with the aforesaid auxiliary parts and members is made of one piece of wire, and may be substituted for or used in place of the spring 11 and the bearing 15, as shown in Fig. 5. In this case, the parts 28 take the place of the arms 27, but are in contact with the inner sides instead of the outer sides of the arms 3, the lugs 29 take the place of the bolt 25, and the uppermost convolution of the spring 21 bears directly against the under edges of said arms 3. To all intents and purposes the operation is the same in both examples.

In practice, when the trolley wheel 6 is brought into contact with the overhead wire the spring 11 (or 21) is contacted, owing to the superior force exerted by the trolley-pole springs, the harp 8 being swung on the axle 5 to raise the bolt 12 and with it the support 13 and the bearing 16, by which motion said spring is compressed, and moving the axle 7 into line with the trolley pole 1, or approximately into such line. The stop 23 limits the movement in this direction of the axle 7, in the manner hereinbefore explained. The wheel 6 is free to revolve beneath the overhead wire, and may move up and down, subject to the control of the spring 11 (or 21), but with comparative freedom, the harp 8 then rocking on the axle 5. More or less lateral movement of the parts also takes place when the wheel 6 follows the overhead wire around a corner. Thus it is seen that the support for the wheel 6 is very flexible, and at the same time affords the necessary freedom of movement to said wheel, other than the rotary motion thereof which motion is not interfered with in any way by the extension, but in some degree may be improved or rendered more free.

When the pole 1 is drawn down to remove the wheel 6 from the wire, the spring 11 (or 21) expands and restores the parts to the position shown in the drawings.

The bearing 16 is provided with an annular groove 30 to receive the base of the spring 11 (or 21), such groove being similar to the groove 24 in the bearing 15.

It has not been deemed necessary to show in connection with the drawings in this case either the trolley-pole springs or the overhead wire to which reference has been made, inasmuch as they are so old and well known.

More or less change in the size, shape, construction, and arrangement of some or all of the parts of the extension, in addition to the modification illustrated and specifically described in connection herewith, may be made without departing from the nature of my invention or exceeding the scope of what is claimed.

What I claim as my invention, and desire to secure by Letters Patent, is—

1. The combination, in a trolley harp extension, with a trolley pole and harp and the axle of the latter, of a supplementary harp and a trolley wheel carried thereby, said supplementary harp being mounted to rock on said axle, and extending in both directions therefrom, and resilient means beneath the first-named harp normally to retain the axis of said wheel out of line with said pole, said resilient means being arranged to bear the rearwardly-extending part of said supplementary harp downwardly.

2. The combination, in a trolley harp extension, with a trolley pole and harp and the axle of the latter, of a supplementary harp and a trolley wheel carried thereby, said supplementary harp comprising a single piece, being mounted to rock on said axle, and extending in both directions beyond the same, a member pivotally connected with the inner terminal of said supplementary harp, and provided with spring-supporting members, and a spring inserted between said members and said trolley-pole harp.

3. The combination, in a trolley harp extension, with a trolley pole and harp, of a supplementary harp and a trolley wheel carried thereby, said supplementary harp being pivotally connected with said trolley-pole harp and extending in both directions from its axis, a bearing attached to said trolley-pole harp, a member pivotally connected with the inner terminal of said supplementary harp, a bearing supported by said member, and a spring between said bearings.

4. The combination, in a trolley harp extension, with a trolley pole and harp, of a supplementary harp pivotally connected with said trolley-pole harp, and having a tail-piece, a trolley wheel carried by said supplementary harp, and a member depending from said tail-piece, a support on said member, a bearing loosely mounted on said support, and a spring interposed between said bearing and said trolley-pole harp.

5. The combination, in a trolley harp extension, with a trolley pole and harp, of a supplementary harp pivotally connected with said trolley-pole harp, and having a tail-piece, a trolley wheel carried by said supplementary harp, a member depending from said tail-piece, a support adjustably connected with said member, a bearing loosely mounted on said support, and a spring interposed between said bearing and said trolley-pole harp.

6. The combination, in a trolley harp extension, with a trolley pole and harp, of a supplementary harp and a trolley wheel carried thereby, said supplementary harp being pivotally connected with said trolley-pole harp, and extending in both directions beyond its axis, resilient means, beneath said first-named harp, arranged to bear the inner terminal of said supplementary harp downwardly, and thus normally to retain the axis of said wheel out of line with said pole, and a stop arranged to limit the movement of said supplementary harp in the direction which compresses said resilient means.

7. The combination, in a trolley harp extension, with a trolley pole and harp and the axle of the latter, of a supplementary harp mounted on said axle, extending in both directions therefrom, and provided with a stop adapted to limit the movement in one direction of said supplementary harp on said axle, a trolley wheel carried by said supplementary harp, and resilient means, beneath said first-named harp, arranged to bear the inner terminal of said supplementary harp downwardly, and thus normally to retain the axis of said wheel out of line with said pole.

WALTER F. FREEMAN.

Witnesses:
F. A. CUTTER,
A. C. FAIRBANKS.